(12) United States Patent
Wüest

(10) Patent No.: US 6,426,503 B1
(45) Date of Patent: Jul. 30, 2002

(54) OPTO-ELECTRONIC ULTRA-VIOLET RADIATION DOSIMETER

(75) Inventor: Martin P. Wüest, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 38 days.

(21) Appl. No.: 09/591,477

(22) Filed: Jun. 9, 2000

(51) Int. Cl.$^7$ ................................................. G01J 1/42
(52) U.S. Cl. ...................................................... 250/372
(58) Field of Search ......................................... 250/372

(56) References Cited

U.S. PATENT DOCUMENTS

| | | | |
|---|---|---|---|
| 3,648,049 A | 3/1972 | Yokota et al. | 250/71.5 |
| 3,787,687 A | 1/1974 | Trumble | 250/83 |
| 3,924,135 A | 12/1975 | Dhar | 250/484 |
| 3,925,665 A | 12/1975 | Robertson et al. | 250/337 |
| 3,971,943 A | * 7/1976 | Jeunehomme et al. | 250/372 |
| 4,308,459 A | 12/1981 | Williams | 250/474 |
| 4,377,751 A | 3/1983 | Kronenberg et al. | 250/474.1 |
| 4,466,941 A | 8/1984 | Cerami et al. | 422/57 |
| 4,704,535 A | 11/1987 | Leber et al. | 250/372 |
| 4,731,323 A | 3/1988 | Cerami et al. | 435/4 |
| 4,788,126 A | 11/1988 | Feldman et al. | 430/138 |
| 4,839,518 A | 6/1989 | Braunlich et al. | 250/337 |
| 4,851,686 A | 7/1989 | Pearson et al. | 250/372 |
| 4,880,986 A | 11/1989 | Yamada et al. | 250/484.1 |
| 4,954,707 A | 9/1990 | Miller et al. | 250/337 |

(List continued on next page.)

OTHER PUBLICATIONS

Daniel Bolliger; "Integration of an Ultraviolet Sensitive Flame Detector", a thesis submitted to the Swiss Federal Institute of Technology Zurich for the degree of Doctor of Natural Sciences; Diss. Eth No. 11359, 1995.

M.F. Mutzhas, et al.; "Reference Action Spectra for Ultraviolet Induced Erythema and Pigmentation of Different Human Skin Types", CIE Research Note; CEI Technical Collection, 1993.

N. Panchaud, et al.; "Flame Detector in the Ultra–Violet Wavelength Region" (found at http://dmtwww.epfl.ch/ims/sysmic/projects/1996/FlameDetector/FlameDet.html).

Spectrex Inc.; "A Guide to Selecting the Right Flame Detector for Your Application" (found at http://www.spectrex-inc.com/sharpeye/guide.htm).

Protectowire; "UV/IR Flame Detector SharpEye™ 20/20L and 20/20LB" (found at http://www.protectowire.com/products/sharpl.html).

Bailey Fisher Porter; "FLAMON Flame Detector" (found at http://www.bailey.ca/icp/inst076a.htm).

William H. Southwell; "Modeling of Optical Thin Films"; Vacuum & Thinfilm, May 1999.

J.D. Brown, et al.; "Visible–Blind UV Digital Camera Based On a 32×32 Array of GaN/AlGaN p–i–n Photodiodes"; MRS Internet Journal Nitride Semiconductor Research, Res. 4, 9, 1999.

E Monroy, et al.; "Ultraviolet Photodetectors Based on $Al_xGa_{1-x}N$ Schottky Barriers"; MRS Internet Journal Nitride Semiconductor Research, Res. 3, 9, 1988.

Boston Electronics Corporation; "A New Generation of Ultraviolet Photodetectors: Silicon Carbide Photodiodes"; (found at http://www.boselec.com/uvhotod.htm).

Primary Examiner—Georgia Epps
Assistant Examiner—M. Hasan
(74) Attorney, Agent, or Firm—Baker Botts L.L.P.

(57) ABSTRACT

A dosimeter 10, which may be easily implemented as a monolithic device, using all-silicon semiconductor fabrication techniques. The dosimeter 10 has a UV filter 11a, whose transmission characteristics match those of the erythema action curve. The filtered radiation is detected by a photodiode, and appropriate signal processing is performed to provide some sort of output indicating UV dosage. Other embodiments use a UV sensitive photodiode without a filter.

33 Claims, 3 Drawing Sheets

U.S. PATENT DOCUMENTS

| | | | |
|---|---|---|---|
| 5,008,548 A | * 4/1991 | Gat | 250/372 |
| 5,025,159 A | 6/1991 | Miller et al. | 250/337 |
| 5,036,311 A | * 7/1991 | Moran et al. | 340/600 |
| 5,059,806 A | 10/1991 | Burgkhardt | 250/484.1 |
| 5,120,969 A | 6/1992 | Kronenberg | 250/474.1 |
| 5,371,004 A | 12/1994 | Quintern | 435/29 |
| 5,500,532 A | 3/1996 | Kozicki | 250/372 |
| 5,637,876 A | 6/1997 | Donahue et al. | 250/474.1 |
| 5,696,381 A | 12/1997 | Quintern | 250/472.1 |
| 5,731,589 A | 3/1998 | Sief et al. | 250/482.1 |
| 5,767,520 A | 6/1998 | Donahue et al. | 250/474.1 |
| 5,777,341 A | 7/1998 | Seiwatz et al. | 250/474.1 |
| 5,891,682 A | 4/1999 | Yoshida et al. | 435/91.2 |

* cited by examiner

OPTO-ELECTRONIC ULTRA-VIOLET RADIATION DOSIMETER

TECHNICAL FIELD OF THE INVENTION

This invention relates to detection of electromagnetic radiation, and more particularly to a personal device for measuring ultraviolet radiation.

BACKGROUND OF THE INVENTION

Ultraviolet (UV) radiation adversely affects human skin from birth to death. In addition to acute adverse effects such as sunburn, chronic exposure can cause premature aging of the skin, actinic keratoses, and basal carcinoma. With the reduction of the stratospheric ozone layer through anthropogenic influences, the problem of UV effects on the human skin may become even more severe.

Ultraviolet radiation can cause damage at the molecular level to organisms. The sensitivity of biological organisms increases with shorter wavelengths because of the higher photon energy. A sensitivity curve for reddening of the skin (erythema action spectra) has been defined by the Commission Internationale de l' Éclairage (CIE).

Several types of ultraviolet B (UVB) detectors exist, including personal dosimeters for warning against harmful UVB rays. One example of a personal UV dosimeter is described by Rettberg and Horneck, 1998. In this dosimeter, spores of the bacterium bacillus subtilis are exposed to UV light. The film is then developed in a laboratory.

The most popular broadband UVB detectors are based on the Robertson-Berger spectrometer, which was developed in the 1970s. The principle of such a spectrometer is as follows. Incident light passes through an UV-transmitting quartz window. Then it passes through a UV-transmitting black glass (Schott UGS filter), which absorbs all the visible light except for a small fraction of the red light. The radiation transmitted through the first filter strikes a UV-B sensitive phosphorescence material ($MgWO_4$). The phosphor absorbs the radiation and re-emits it as a visible green light. A second, green-glass filter (Corning 4010 filter) passes the fluorescent light from the phosphor while blocking the red light transmitted by the black glass. The intensity of the fluorescent light is measured by a solid state GaAsP photodiode, which has a peak response in the green and is not sensitive to red light. Small Robertson-Berger UV dosimeters systems weigh 200 grams or so and are expensive, making them too heavy and costly for a personal application.

SUMMARY OF THE INVENTION

One aspect of the invention is a dosimeter for measuring UV radiation. A UV filter has transmission characteristics that correspond to an erythema action curve, having two different decays in the high UV range. A photodiode receives UV radiation from the filter and outputs a current representing the amount of received radiation. An analog to digital converter converts the current into a digital signal. A logic circuit that converts the digital signal to an output value. An output means that indicates the output value to the user, and at least one input means permits the user to operate the dosimeter. The logic circuit can be a processor, so as to provide various programming and calculating features. The output and input devices can be as simple as an LED display and an on/off button, with additional features being possible as manufacturing choices.

An advantage of the invention is that no wavelength conversion by a phosphor is required. Instead, a photodiode behind a UV-transmissive filter is used. The photodiode, the filter, and all associated processing electronics may be implemented on a monolithic silicon wafer, thus providing an opto-electronic sensor on a chip.

The dosimeter provides real-time and quantitative data to prevent sunburn. It is compact and sufficiently inexpensive for consumer application, especially when mass-produced using semiconductor technology.

DETAILED DESCRIPTION OF THE INVENTION

Dosimeter with Filter/Diode Sensor

Figure 1:
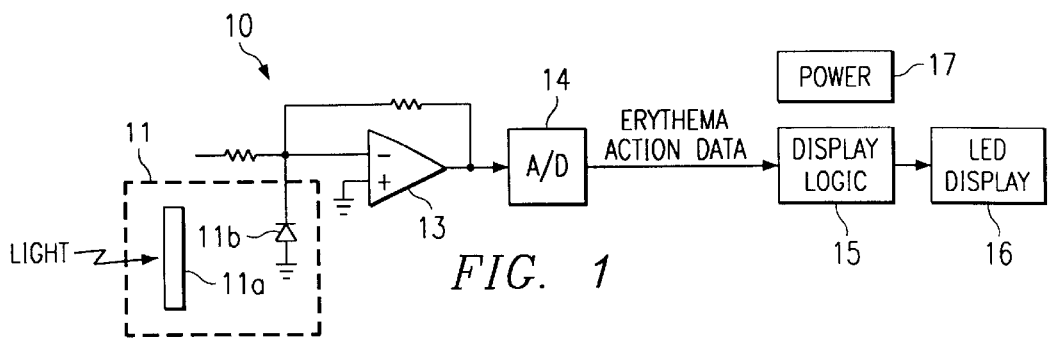
FIG. 1 is a schematic diagram of the internal circuitry of a UV dosimeter in accordance with the invention.
Figure 2:
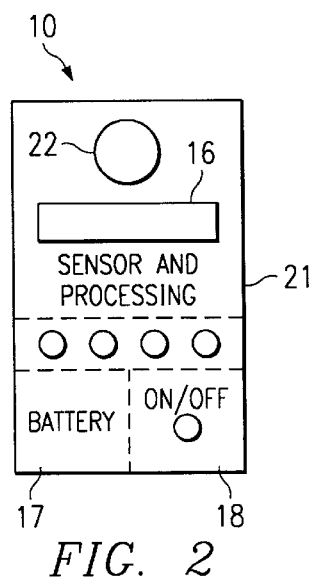
FIG. 2 illustrates the front of the housing for the dosimeter of FIG. 1.

FIGS. 1 and 2 illustrate one embodiment of an ultraviolet (UV) dosimeter 10 in accordance with the invention. FIG. 1 is a schematic diagram of the internal components; FIG. 2 is a front view of the dosimeter 10.

As explained below, dosimeter 10 is an integrated opto-electronic device. At least its sensor 11 and if desired, additional or all of the internals components of FIG. 1 may be implemented monolithically on a silicon wafer. Dosimeter 10 is "broadband" in the sense that it detects UV-A and UV-B radiation, i.e., radiation between 250 and 400 nanometers. As explained below, a feature of the invention is the manner in which dosimeter 10 measures UV in a manner that parallels the skin's actual sensitivity, especially from about 298 to 400 nm.

Sensor 11 comprises a filter 11*a* and photodiode 11*b*, which may be manufactured from a silicon wafer, in a manner similar to manufacture of integrated circuits. In FIG. 1, these elements are illustrated schematically, but a feature of the invention is that they need not be discrete components. A suitable size for sensor 11 is one to a few millimeters in diameter.

Figure 3:
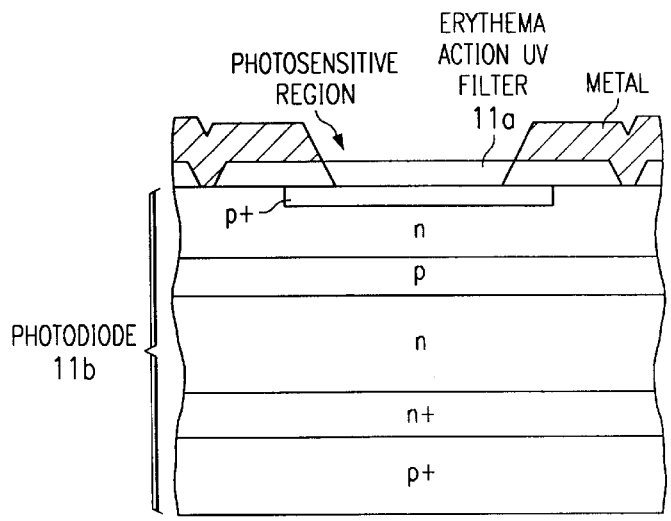
FIG. 3 illustrates the fabrication layers of the sensor of FIG. 1.

FIG. 3 illustrates the fabrication layers of sensor 11, implemented as layers of photodiode 11*b* with filter 11*a* fabricated over it. Light enters dosimeter 10 through filter 11*a*, which prevents non-UV radiation from reaching photodiode 11*b*.

Figure 4:
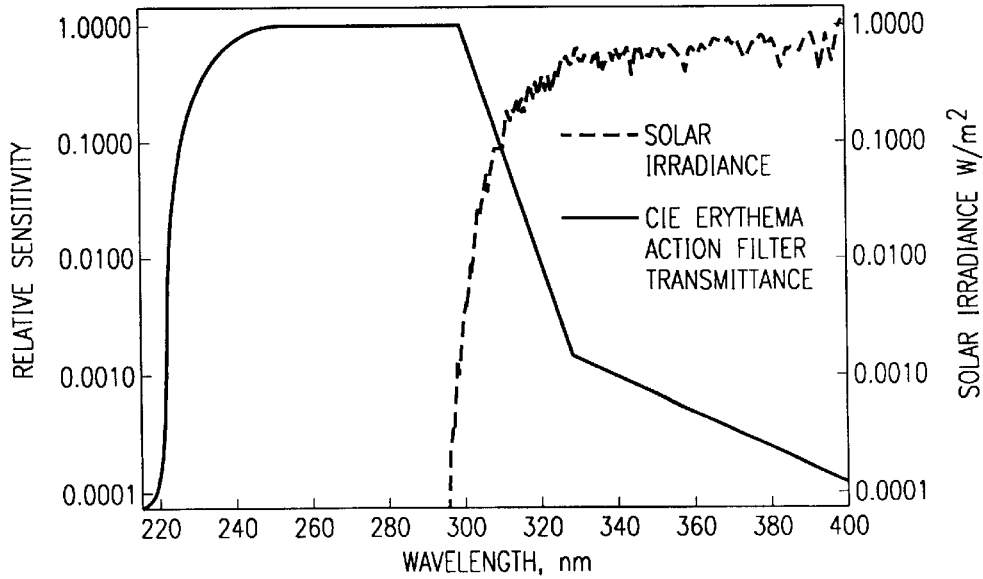
FIG. 4 illustrates the transmission characteristics of the filter of FIGS. 1 and 3 on log-linear scale.

FIG. 4 illustrates the transmission profile of filter 11*a* on a log-linear scale. As shown, filter 11*a* is a short wavelength pass through filter, constructed so that its transmission profile corresponds to that of the CIE erythema action curve discussed in the Background. In other words, filter 11*a* corresponds to the sensitivity of the skin to UV radiation.

The transmission curve of FIG. 4 is shown on a log scale of the transmission factor, with the values on the y axis being relative to maximum transmission. The following table describes the transmission characteristics:

| [nm] | Transmission |
|---|---|
| 250 | 1.0 |
| 298 | 1.0 |
| 300 | 0.65 |
| 310 | 0.074 |
| 320 | 0.0086 |
| 330 | 0.0014 |
| 340 | 0.00097 |
| 350 | 0.00068 |
| 360 | 0.00048 |
| 370 | 0.00034 |
| 380 | 0.00024 |
| 390 | 0.00017 |
| 400 | 0.00012 |

The transmission formula can be expressed mathematically as follows:

$T(\lambda) = 1.0$  $(250 <= \lambda <= 298$ nm$)$
$T(\lambda) = 10E(0.094*(298 - \lambda))$  $(298 <= \lambda <= 328$ nm$)$
$T(\lambda) = 10E(0.015*(139 - \lambda))$  $(328 <= \lambda <= 400$ nm$)$ As illustrated, filter 11a transmits incident radiation to photodiode lib from 250 nm to 400 nm. From 250 nm to about 298 nm, the top of the curve is flat, indicating a uniform response. The edge at 250 nm should be sharp because dosimeter 10 is intended for UV measurements. This filter characteristic may be somewhat inherent in that few filter materials are good transmitters for radiation below 250 nm.

From approximately 298 nm to 400 nm the pass range of filter 11a is neither flat nor linear. At approximately 298 to 328 nm, transmission drops off sharply. From approximately 328 nm to 400 nm, the transmission drops off but not as sharply. Thus, filter 11a responds to a fast decrease in the skin's sensitivity to UV between 298 and 328 nm, and a slower decrease in sensitivity between 328 and 400 nm. As an example, at an exposure of 380 nm, it would take about 4000 times longer (more than 3 orders of magnitude) to become sunburned than at 280 nm, but UV burning could nevertheless occur.

The transmission of filter 11a, in particular its fall off of transmittance from about 298 nm to about 400 nm may also be described as a "double decay". A first decay is followed by a second and different decay. For purposes of this description, the two decays are said to refer at the "high" end of the UV range. On a log-linear scale of FIG. 4, the decays are linear.

Referring again to FIGS. 1 and 3, an example of a suitable filter 11a is a multi layer interference filter. As such, it consists of multiple thin layers of dielectric material having different refractive indices. There also may be metallic layers. Interference filters are wavelength-selective by virtue of interference effects that take place between the incident and reflected waves at the thin-film boundaries.

Experimentation has shown that filter 11a may be constructed with layers of hafnium, silicon oxide, and aluminum. A 75 layer filter having layers of these materials has been designed for the transmission characteristics of FIG. 4. Such a filter 11a may be fabricated over photodiode 11b using conventional silicon fabrication techniques, such as vapor deposition and evaporation.

The light from filter 11a reaches photodiode 11b, which provides a photo current that is proportional to the amount of UV radiation. Photodiode 11b is a silicon photodiode, fabricated on a silicon substrate, a process that may be performed using known semiconductor fabrication techniques. Generally, photodiode 11b is created with ion implantation over photodiode 11b, with a shallow ion doping profile. A photodiode constructed with ion implantation and shallow doping tends to provide enhanced sensitivity. However, other conventional PN layering techniques could be used, with enhanced amplification if desired.

The photodiode response to UV radiation from 250–400 nm should preferably be uniform. Although the sensitivity of photodiode 11b need not be limited to UV radiation, a limited sensitivity range may result in a stronger output signal. Also, a diode 11a whose range does not include wavelengths below 250 nm will help provide a sensor 11 whose overall sensitivity does not include radiation in that range.

Amplifier 13 amplifies the photo current from sensor 11. Amplifier 13 may be any suitable amplifier, such as an operational amplifier. In the example of FIG. 1, amplifier 13 is a transimpedence operational amplifier.

Analog-to-digital (A/D) converter 14 digitizes the amplified signal. In the embodiment of FIG. 1, the output of A/D converter 14 is delivered to a logic circuit 15, which generates appropriate signals for LED display 16. Specifically, logic circuit performs unit conversion from photo current to units that represent UV radiation levels. For basic operation of dosimeter 10, a simple logic circuit could be used; an alternative embodiment with more sophisticated programming features is described below in connection with FIG. 5.

Display 16 provides an indication of the level of UV, in units understandable to the user. In the example of FIG. 1, display 16 is a simple LED unit, requiring only the simple circuitry of logic circuit 15. In other embodiments, a full screen display, such as an LCD display could be used.

Irradiance dosages can be measured in various units, such as $W/m^2$, median erythema dose (MED) per unit of time, or UVI. Depending on the processing complexity of dosimeter 10, the appropriate units can be pre-programmed or set by the user.

In the embodiment of FIG. 2, dosimeter 10 is battery powered, with one or more small batteries contained in a power unit 17. A keypad 18 has push button keys for user selections. At least one key for on/off operation is provided; other selections might be added, such as one or more of the features described below in connection with FIG. 5 with processing capability enhanced accordingly. The buttons of keypad 18 may resembles those used for wristwatches and the like.

Alternatively, power unit 17 may be a solar power unit. In this case, operation of dosimeter 10 might be similar to that of a small pocket calculator, such that no user-activated on/off switching is used.

Using semiconductor fabrication techniques, all of the electrical components of dosimeter 10 may be easily implemented as an integrated circuit. Specifically, sensor 11, amplifier 13, display logic 15, and LED display 16 could all be fabricated on a silicon wafer. The entire dosimeter 10, not just sensor 11, would then be monolithic except for the batteries in power unit 17 and the mechanisms of keypad 18. Various other alternatives exist; any two or more components could be implemented as an integrated circuit.

As shown in FIG. 2, the entire dosimeter 10 is easily contained in a small compact housing 21. A UV transparent window 22 is placed over sensor 11. If desired, window 22 may be optically configured to compensate for different angles of incident radiation, such as by being hemispherical in shape.

Figure 5:
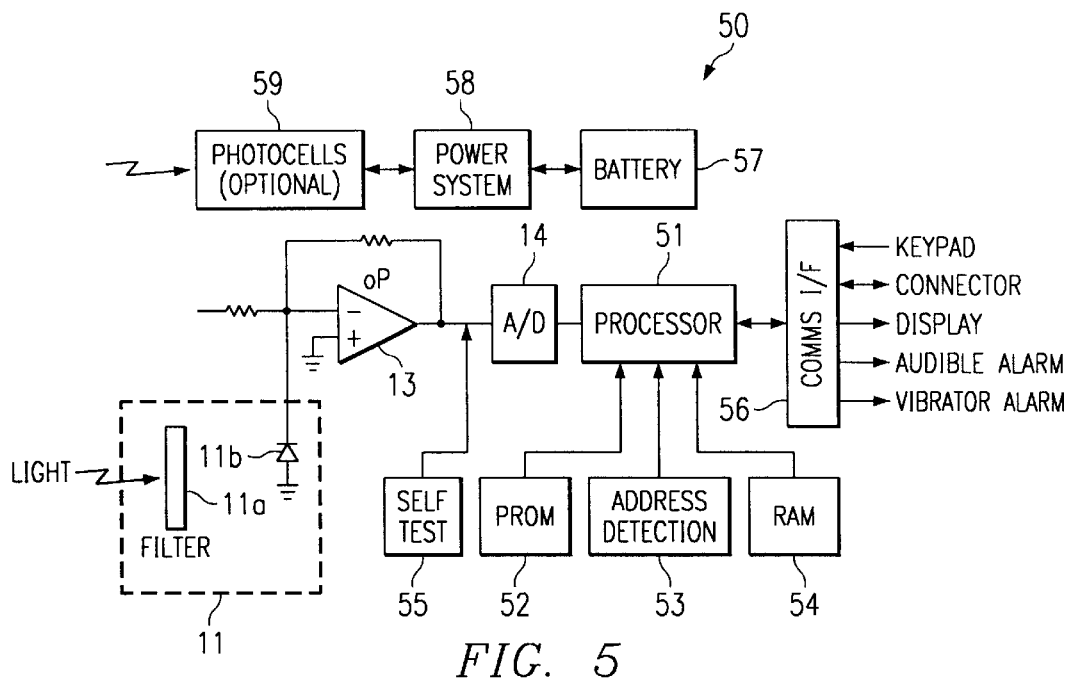
FIG. 5 illustrates an enhanced embodiment of the dosimeter.

FIG. 5 illustrates an enhanced embodiment of the invention, a processor-based dosimeter 50. Sensor 11, amplifier 13, and A/D converter 14 may be the same as those described above in connection with FIGS. 1–4.

The output of A/D converter 14 is delivered to a processor 51. Processor 51 performs the conversion of photo current data to output units in a manner similar to the logic circuit of FIG. 1. Additionally, processor 51 is in communications with both data and program memory, which are implemented as PROM (or ROM) 52 and RAM 54 in the example of this description. An address detection circuit 53 provides access for processor 51 to locations in memory 52 and 54.

Various modes of dosimeter 50 might be a time, date, elapsed time, or timer mode. For example, dosimeter 50 might be programmed to display a relative dose (%) with respect to a maximum desired daily dose, remaining time until a predetermined dose has been reached, or actual values for the day so far.

Other processing tasks might include conversion of units of measurement or irradiance. For example, if dosimeter 20 is calibrated for MED units, processor 25 could be programmed to provide output expressed in terms of millijoules per centimeter squared. For example, an output of MED per hour (MED/h) might be converted to an output reading of millijoules per centimeter squared (mJ/cm$^2$).

Communications interface 56 interacts with various input and output devices. The input device may be a keypad, similar to the keypad illustrated in FIG. 2. Although not illustrated in FIG. 5, dosimeter 50 could be voice activated, having appropriate signal processing circuitry for converting voice input to processor commands. The input device may be used to instruct processor 21 to perform any of the various processing tasks discussed above. For a dosimeter 50 having a screen display, menu selections could be displayed.

Output devices may be in the form of a display, which may be a full two dimensional screen display or a calculator-type line display or a linear array of LEDs. Output may alternatively or additionally be provided in the form of an audible or visible alarm, which activates when the UV level reaches a certain level. This level may be preprogrammed into memory 52 or set by the user using an input device.

Another possible output device might be a connector for transmitting data to another processing station. For example, communications interface 56 might deliver data to an RS-232 connector. An example of an application for which a connector such as this might be useful is in the case of a light radiation therapy station, where dosimeter would be used to monitor UV radiation, and the contents of RAM 24 delivered to a remote computer for analysis.

Dosimeter 10 is powered by a power unit 58, which may rely on battery 57 or photocell 59 or both. Thus, photocell unit 59 may be used instead of, or in addition to, batteries 27. Where RAM 24 stores data, battery 27 is used in addition to photocell 59 to prevent data loss.

The processing circuitry (processor 51 and memory 52 and 54) of dosimeter 50 permits various statistical analysis. For example, dosimeter readings can be stored over time. Averages can be displayed over some desired time period, depending on a selected unit. For example, the average UV level may be displayed in units such as per minute or per hour. Or, the user may obtain readouts of past UV levels, for example, the highest and lowest UV levels over the past week.

The processing circuitry could be further programmed to accept values representing a skin type, so that desired dosages could be calibrated. Other input values might be a sun protection factor, a country for purposes of MED/UVI conversion, a time zone, time, data, and timer. Elapsed time could be set, as well as desired output units.

Figure 6:
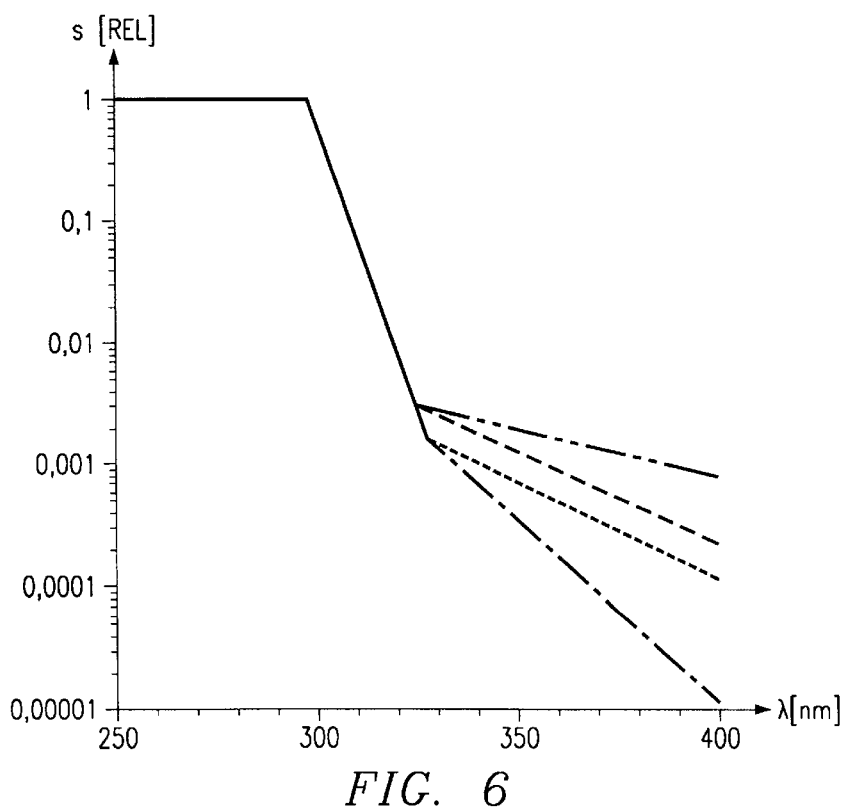
FIG. 6 illustrates how the dosimeter may be programmed to calculate compensated dosage values for different skin types.

FIG. 6 illustrates how the transmittance curve for filter 11a can be refined for different skin types. The curve of FIG. 6 corresponds to four different "skin type" sensitivities proposed as part of the erythema action spectra. If a skin type is selected, such as by being preprogrammed for place-of-sale localization or such as by input from a user, processor 51 can be programmed to compensate the response of sensor 11 to the appropriate skin type.

A useful implementation of dosimeter 10 would be as a wristwatch type device, with dosimeter 10 mounted in a small housing attached to a wristband. The dosimeter 10 would warn the user when a particular UV dose has been received. The warning might be in the form of an alarm or vibration mechanism.

Dosimeter with Filterless Sensor

The embodiment described above, having a filter/diode sensor 11 is a silicon implementation, and is easily integrated with other elements to form a monolithic design of dosimeter 10. Alternative embodiments of sensor 11 that do not use a filter may also be used.

Figure 7:
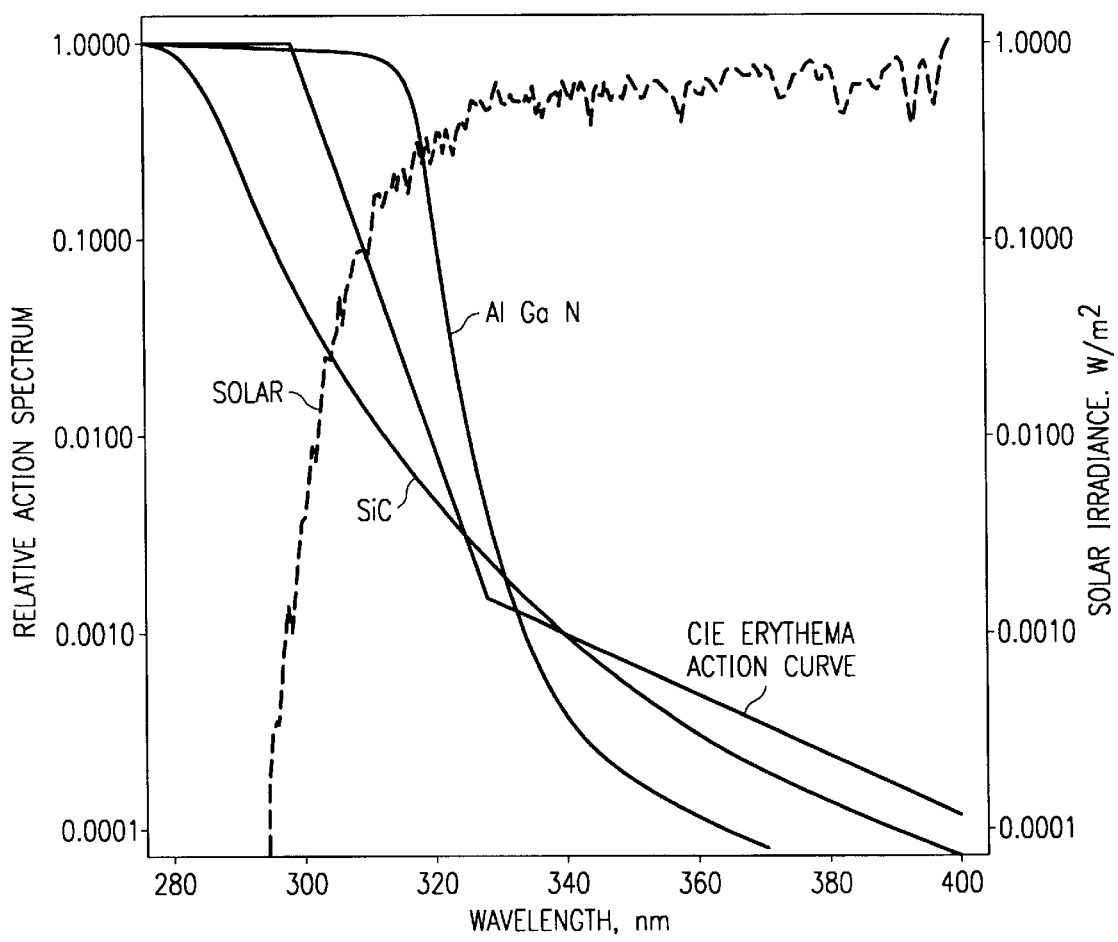
FIG. 7 illustrates the response characteristics of an AlGaN and a SiC photodiode, relative to the erythema action curve.

FIG. 7 illustrates the response curve for an AlGaN (aluminum gallium nitrate) photodiode, relative to the erythema action curve. As illustrated, this response curve provides a reasonable correspondence to the erythema action curve, and thus such a diode may be used as the diode 11b of FIG. 1 without filter 11a. Flip-chip bonding techniques may be used to hybridize the photodiode 11b to silicon elements, such as amplifier 13 and other elements of FIG. 1. Other photodiodes, such as SiC (silicon carbide) diodes might also be similarly used for dosimeter 10, thereby creating a hybrid integrated circuit. For these UV-sensitive photodiodes, the doping profiles can be adjusted to provide a response that most closely matches that of the erythema action curve.

Other Embodiments

Although the present invention has been described in detail, it should be understood that various changes, substitutions, and alterations can be made hereto without departing from the spirit and scope of the invention as defined by the appended claims.

What is claimed is:

1. A dosimeter for measuring UV radiation, comprising:
   a UV filter whose transmission characteristics correspond to an erythema action curve, having two different decays in the high UV range;
   a photodiode that receives UV radiation from the filter and outputs an electrical signal representing the amount of received radiation;
   an analog to digital converter that converts the electrical signal into a digital signal;
   a logic circuit that converts the digital signal to an output value;
   an output means that indicates the output value to the user; and
   wherein the filter and the photodiode are manufactured using semiconductor fabrication techniques as an integrated circuit.

2. The dosimeter of claim 1, wherein the high UV range is from approximately 298 nanometers to approximately 400 nanometers.

3. The dosimeter of claim 1, wherein the filter and the photodiode are manufactured using silicon fabrication techniques.

4. The dosimeter of claim 1, wherein the filter, the photodiode, and the analog to digital converter are manufactured as an integrated circuit.

5. The dosimeter of claim 1, wherein the filter, the photodiode, the analog to digital converter, and the logic circuit are manufactured as an integrated circuit.

6. The dosimeter of claim 1, wherein the different decays are substantially linear when the transmission characteristics are modeled on a log-linear scale.

7. The dosimeter of claim 1, wherein the logic circuit is a processor.

8. The dosimeter of claim 1, wherein the output means is an LED display.

9. The dosimeter of claim 1, wherein the output means is a two dimensional screen display.

10. The dosimeter of claim 1, wherein the output means indicates the output value by displaying a dosage value.

11. The dosimeter of claim 1, wherein the output means indicates the output value by providing an alarm.

12. The dosimeter of claim 11, wherein the alarm is a visible alarm.

13. The dosimeter of claim 11, wherein the alarm is an audible alarm.

14. The dosimeter of claim 11, wherein the dosimeter further comprises a vibrating mechanism and the alarm is a signal that actuates the vibrating mechanism.

15. The dosimeter of claim 1, further comprising an amplifier that amplifies current received from the photodiode.

16. The dosimeter of claim 1, wherein the logic circuit is a processor that compensates the output value to a selected skin type.

17. The dosimeter of claim 1, wherein the filter is a multi-layer interference filter.

18. The dosimeter of claim 17, wherein the filter has one or more layers of hafnium.

19. The dosimeter of claim 17, wherein the filter has one or more layers of silicon oxide.

20. The dosimeter of claim 17, wherein the filter has one or more layers of aluminum.

21. The dosimeter of claim 1, wherein the filter is configurable to correspond to different skin sensitivities.

22. The dosimeter of claim 1, wherein the filter is configurable by the user of the dosimeter.

23. A dosimeter for measuring UV radiation, comprising:

a UV sensitive photodiode that receives UV radiation from the filter and outputs a current representing the amount of received radiation, wherein the sensitivity of the photodiode substantially corresponds to the erythema action curve, and wherein the photodiode is made primarily of aluminum gallium nitrate;

an amplifier that receives and amplifies electrical output from the photodiode;

an analog to digital converter that converts the electrical output into a digital signal;

a logic circuit that converts the digital signal to an output value; and an output means that indicates the output value to the user;

wherein at least the photodiode, amplifier, and analog to digital converter are implemented as an integrated circuit.

24. The dosimeter of claim 23, wherein the logic circuit is a processor.

25. The dosimeter of claim 24, wherein the output means is an LED display.

26. The dosimeter of claim 23, wherein the output means is a two dimensional screen display.

27. The dosimeter of claim 23, wherein the output means indicates the output value by displaying a dosage value.

28. The dosimeter of claim 23, wherein the output means indicates the output value by providing an alarm.

29. The dosimeter of claim 23, wherein the alarm is a visible alarm.

30. The dosimeter of claim 23, wherein the alarm is an audible alarm.

31. The dosimeter of claim 23, wherein the dosimeter further comprises a vibrating mechanism and the alarm is a signal that actuates the vibrating mechanism.

32. The dosimeter of claim 23, further comprising an amplifier that amplifies current received from the photodiode.

33. The dosimeter of claim 23, wherein the logic circuit is a processor that compensates the output value to a selected skin type.

* * * * *